C. WATTLEWORTH.
INTERLOCKING MOLD.
APPLICATION FILED AUG. 17, 1917.

1,285,853.

Patented Nov. 26, 1918.
2 SHEETS—SHEET 1.

Inventor
Charles Wattleworth,
By C. L. Landon
his Attorney.

Witness
R. A. Trogner.

C. WATTLEWORTH.
INTERLOCKING MOLD.
APPLICATION FILED AUG. 17, 1917.
1,285,853.
Patented Nov. 26, 1918.
2 SHEETS—SHEET 2.
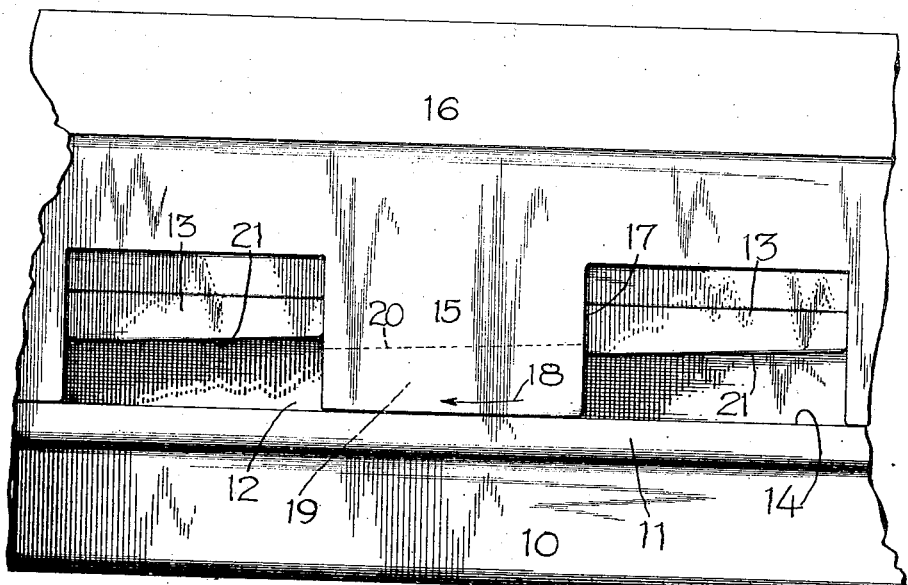
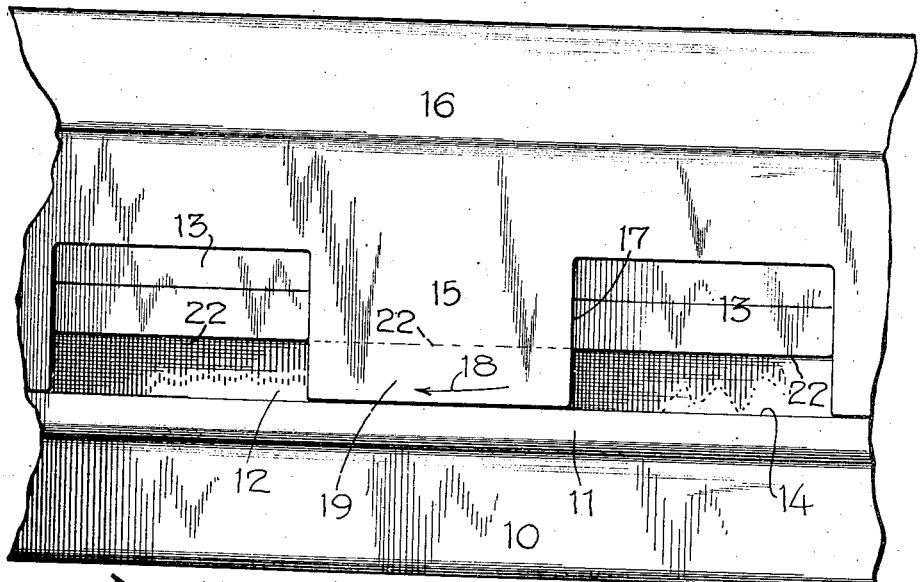
Inventor
Charles Wattleworth,
By C. L. Landon
his Attorney.
Witness

UNITED STATES PATENT OFFICE.

CHARLES WATTLEWORTH, OF AKRON, OHIO, ASSIGNOR TO THE GOODYEAR TIRE & RUBBER COMPANY, A CORPORATION OF OHIO.

INTERLOCKING MOLD.

1,285,853.    Specification of Letters Patent.    Patented Nov. 26, 1918.

Application filed August 17, 1917. Serial No. 186,757.

*To all whom it may concern:*

Be it known that I, CHARLES WATTLEWORTH, a citizen of the United States, residing at Akron, in the county of Summit and State of Ohio, have invented new and useful Improvements in Interlocking Molds, of which the following is a specification.

My present invention relates to vulcanizing molds of the general type used in tire manufacture and constructed of complemental sections adapted to be mated for inclosing the tire to be vulcanized.

The commonly accepted practice of vulcanizing pneumatic vehicle tires calls for the filling of a hydraulic press with a plurality of molds, each of which contains a tire to be cured. The molds are then simultaneously compressed against a fixed head by the action of a hydraulic plunger until the complemental parts composing each mold are properly and respectively mated to apply the required pressure to the contained tires.

The use of the hydraulic apparatus for obtaining the proper mating of the mold parts is unduly expensive for the apparatus is cumbersome, occupying therefore an undue amount of floor space, and is also slow operating.

The principal object of the invention is therefore to provide a mold of such construction that the expensive hydraulic apparatus may be dispensed with and to advantage by positively interlocking the mating mold parts in a manner and by means which assures a proper degree of compression of the contained tire carcasses.

Another and more specific object of the invention is to provide means whereby a degree of pressure between the mold parts may be varied at will through adjustment of the means which interlock the mold parts.

In carrying out my invention I provide the mold parts at their peripheral mating edges with a plurality of corresponding male and female locking flanges of such nature that an axial mating of the mold parts, which seats the male flanges between the female flanges, followed by a partial rotation of the mold parts in opposite directions, which interlocks the two sets of flanges, serves to close the mold tightly upon the article to be cured or vulcanized without the need for application to the molds of further pressure means. The engaging surfaces of the male and female locking members are oppositely beveled whereby the degree of pressure between the mold parts may be varied without an unlocking of the apparatus.

The above and additional objects of a similar nature, which will be hereinafter more specifically treated, are preferably accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts:

Fig. 3 is an edge elevation of the mold showing the beveled faces of the locking members just prior to their movement into actual locking position;

Fig. 4 is a view similar to Fig. 3 but showing a mold in which the locking elements are provided with straight and unbeveled faces; and Fig. 5 is a fragmentary, perspective view of a portion of the mold periphery when the elements have been moved into locked position.

Figure 1:
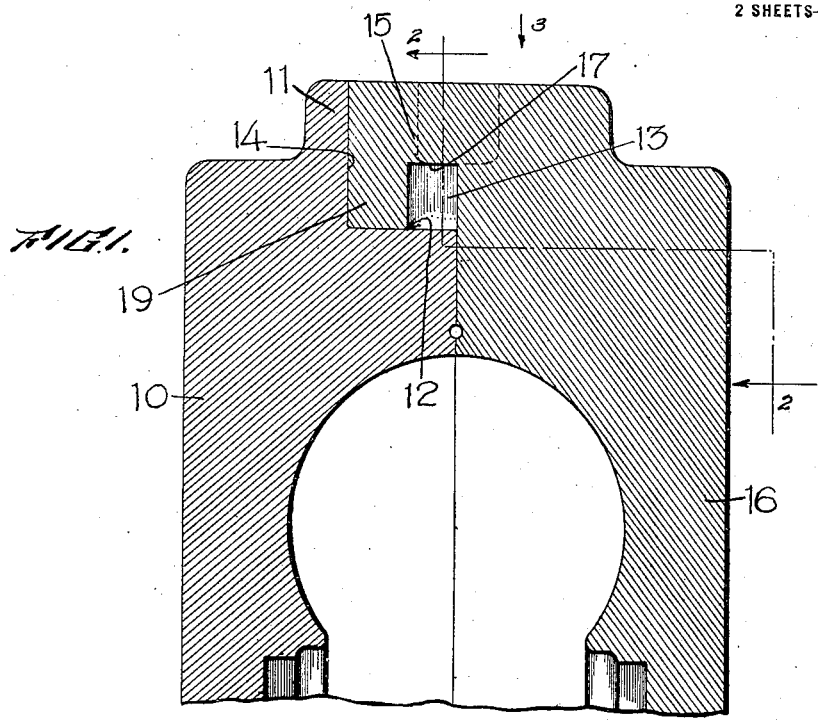
Figure 1 is a partial cross-sectional view taken through an interlocking mold such as is comprehended by this invention, illustrating the parts in their mating position just prior to the partial rotation whereby they are locked in the mating position.

In all its main features, save only the locking means interposed between the opposite mold parts, the mold of my invention may be constructed in accordance with the present practice. The locking elements are arranged at the periphery of each mold part or section and in such position that they are adapted to engage with each other when the mold parts are brought into their mated position.

The female mold part 10 is constructed with an outwardly extending peripheral flange 11 which forms one boundary of the annular locking recess indicated as a whole by the numeral 12. The opposite boundary of the locking recess or channel 12 is formed by a series of peripheral locking flanges 13 which form spaced locking shoulders that lie in parallelism with the flange 11, being spaced therefrom by the locking recess 12, and being of somewhat less diameter. The inner face 14 of the flange 11 is contacted with by the locking elements 15 of the male mold part 16, said flange 11 providing an annular shoulder which serves as an abutment or a seat for the locking elements 15.

This latter is the exact counterpart of the female mold part 10, with the exception of the locking extensions 15 each of which is of the same width, over all, as the flange face or seat 14. Each of these extensions 15 is formed to provide a channel 17 to accommodate the locking shoulders 13 of the female mold part and to provide a locking toe 19 to fit in the annular recess 12 and occupy the space between the seat 14 and the locking flanges 13. The spaces between the members of the peripherally arranged series of male locking elements 15 correspond exactly to the spaces left between the members of the peripherally arranged series of locking shoulders 13 carried by the female mold part.

Figure 2:
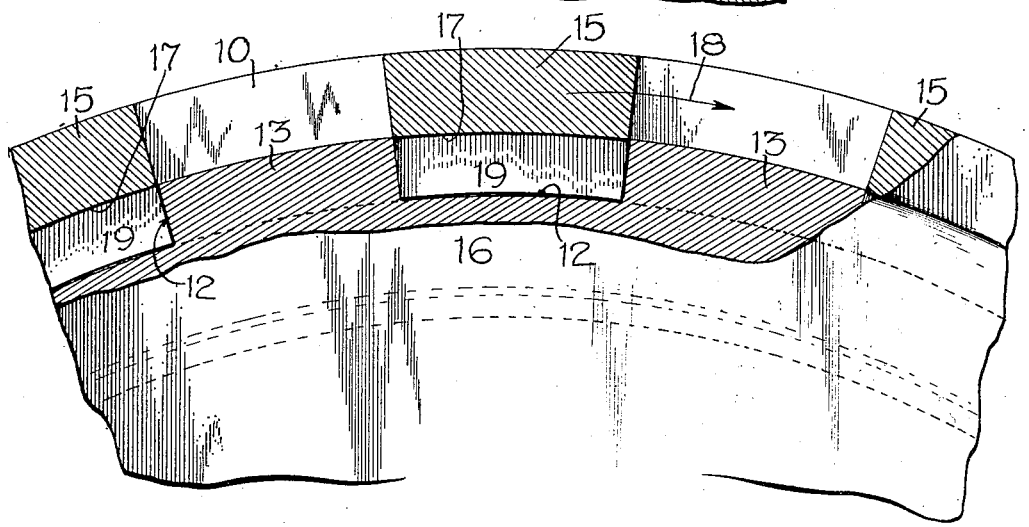
Fig. 2 is a cross-sectional view taken along the line 2—2 of Fig. 1.

When fitting the mold parts together to secure an interlocking arrangement therebetween which will obviate all necessity for external pressure upon the mold, the mold part 16 is approached to the female mold part 10 and the castellated series of locking members 15 are passed through the spaces between the locking elements 13 of the female mold portion and disposed in contact with the seat or flange face 14, this position being best illustrated in Fig. 2. With the parts in the position shown, a partial rotation of one of the mold parts in respect to the other, in the direction of the arrow 18 of Fig. 2, will cause the locking toe 19 of each locking member 15 to engage a member of the peripheral series of locking shoulders 13, until the parts have assumed the position shown in Fig. 5. The outer wall of the channel 17 passes by the outer extremity of the locking shoulder 13 and the locking toe 19 is moved between the seat 14 and is pressed against said locking shoulder, thus forming an interlocking connection between the mold parts which renders them inseparable until a reversal of the locking operation takes place.

Fig. 3 illustrates an arrangement which operates exactly in the manner set forth but has the additional feature that the one face of the locking toe 19 is formed with a bevel, here designated by the numeral 20, which is adapted to engage with a similarly beveled outer face 21 of the female locking shoulder 13. This construction permits the pressure between the mold parts to be varied at will by variation of amount of force with which the beveled surfaces are engaged.

The construction of Fig. 4 differs in no essential from that of Fig. 3 save that the contacting faces of the male locking toe and of the female locking shoulder are formed as a straight line, which provides a locking engagement fully as desirable as the beveled face engagement, save in that no varying degree of pressure between the mold parts is obtainable.

By the construction of a mold in which the two mold parts are provided with interlocking elements which do not project beyond the ordinary mold contour (being arranged within any overall diameter of the mold) and which are capable of being readily mated into the locking relation, and even into the special locking relation of variable pressure, I have evolved a most satisfactory answer to the difficulties previously arising in this art and traceable to the expensive and unwieldy apparatus which was heretofore considered necessary to obtain a proper pressure upon the article to be vulcanized within the mold.

What I claim is:

1. A mold comprising a section formed to provide an abutment, and shoulders spaced from said abutment, and a section formed to provide members thereon disposable between said abutment and said shoulders to lock the sections together.

2. A mold comprising a section formed to provide an abutment, and a series of shoulders spaced from and substantially parallel to said abutment, and a section provided with a series of members disposable between said abutment and said shoulders to lock the sections together by pressure on said shoulders.

3. A mold comprising a section formed to provide an abutment, and shoulders spaced from said abutment, and a section having thereon extensions provided with locking toes adapted to fit between said abutment and said shoulders to clamp the sections together.

4. An annular mold comprising a section formed to provide an outwardly extending flange, and shoulders spaced from and substantially parallel to said flange, and a section having members thereon disposable in the space between said flange and said shoulders, said members adapted to clamp the sections together by engaging with said shoulders.

5. An annular mold comprising a section formed to provide an outwardly extending flange, and a series of shoulders spaced from said flange and arranged in alinement circumferentially of the section, and a section having members thereon adapted to extend inwardly between said flange and said shoulders and press against said shoulders to lock the sections together.

6. An annular mold comprising a section having a plurality of shoulders arranged substantially in alinement around the outer periphery of the section, and a section having members thereon adapted to bear against said shoulders when one of the sections is partially turned relatively to the other section.

7. An annular mold comprising a section having a plurality of shoulders arranged substantially in alinement around the outer periphery of the section, and a section having members thereon adapted to bear against said shoulders when one of the sections is partially turned relatively to the other section, the contacting faces of said shoulders and said members being beveled to secure varying degrees of locking pressure between the sections.

8. An annular mold comprising a section having a plurality of locking elements arranged substantially in alinement around the outer periphery of the section, and a section having a plurality of locking members arranged substantially in alinement around the outer periphery of said section, and adapted to lock the mold by pressing against said locking elements when one of the sections is turned relatively to the other section.

9. An annular mold comprising a section having a plurality of locking elements arranged substantially in alinement around the outer periphery of the section, and a section having a plurality of locking members arranged substantially in alinement around the outer periphery of the section, and adapted to lock the mold by pressing against said locking elements when one of the sections is turned relatively to the other section, the contacting faces of said locking elements and said locking members being beveled to secure varying degrees of locking pressure between the sections.

10. A mold comprising a section having a flange, and shoulders spaced from said flange, and a section provided with extensions formed with channels to receive said shoulders, and with locking toes disposable in the space between said flange and said shoulders, said locking toes adapted to press against said shoulders when one of the sections is partially turned relatively to the other section.

In testimony whereof I have signed my name in the presence of two subscribing witnesses.

CHARLES WATTLEWORTH.

Witnesses:
 B. J. McDANEL,
 R. S. TROGNER.